John Sorensen
INVENTOR

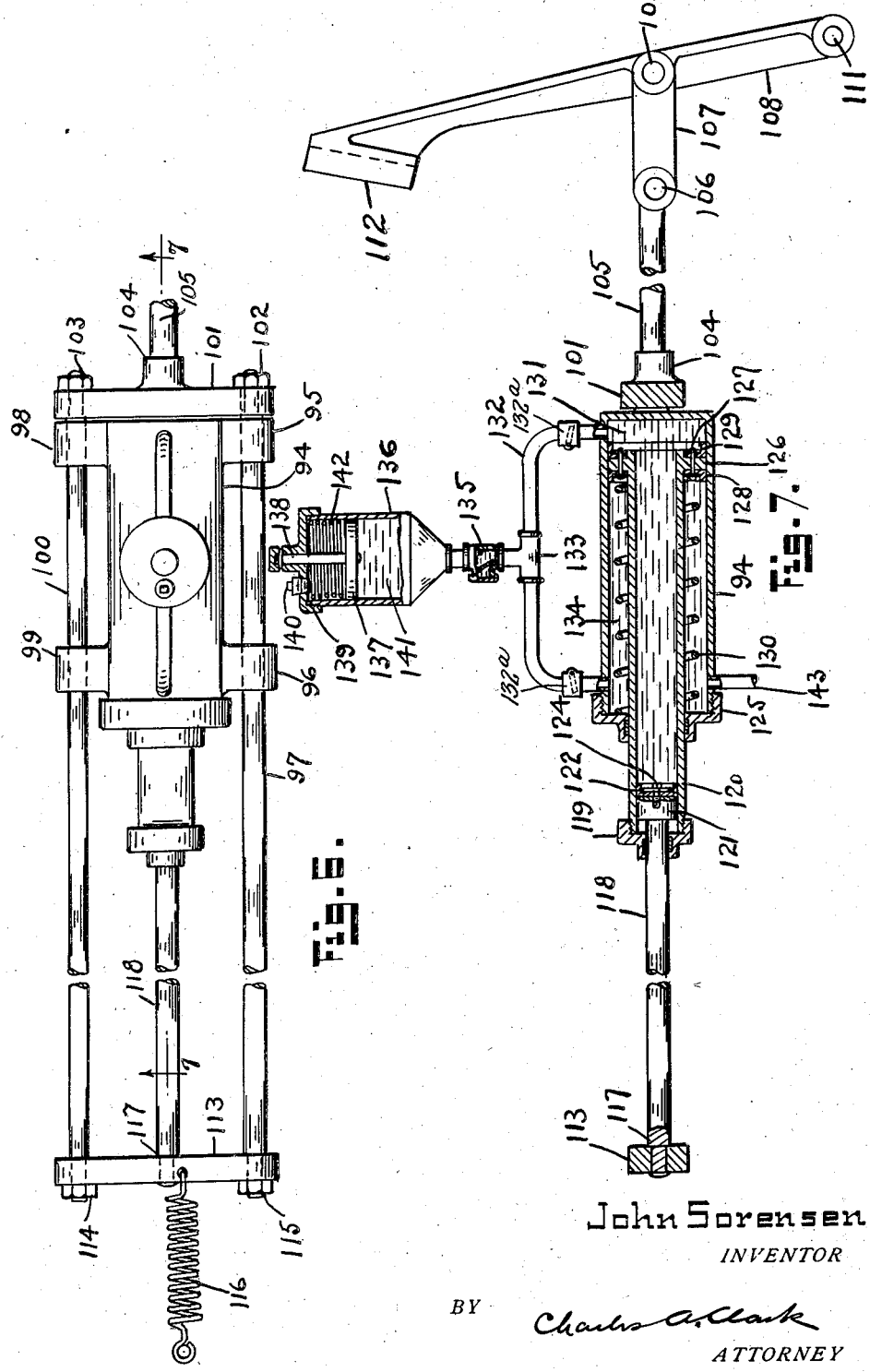

Patented July 2, 1935

2,006,487

UNITED STATES PATENT OFFICE 2,006,487

HYDRAULIC BRAKE OPERATING MECHANISM

John Sorensen, Weehawken, N. J.

Application March 15, 1929, Serial No. 347,228

16 Claims. (Cl. 60—54.6)

My invention relates to hydraulic brake operating mechanisms and is illustrated by a hydraulic brake mechanism in which the piston of the pressure cylinder is operated preferably in connection with a power actuator and is provided with a hollow piston rod in communication with the pressure cylinder, and provided with a piston of smaller area than the pressure piston, directly connected to a physically operable part so that pressure applied to the liquid in the pressure cylinder by the power actuator, or by physical force, or both, will be transmitted through said piston of smaller area to the physically operable part and by its variable reaction thereon will apprise the operator as to the power being exerted upon the brakes. My invention also includes controlling valve mechanism for the actuator operated by the relative movement of the said piston of smaller area with respect to the said hollow piston rod, and specifically a valve mechanism carried by said hollow piston rod, and including an oscillating part connected with a toothed part or pinion engaged by a rack connected with the said piston of smaller area.

My invention also includes the interposition of yielding means as a spring between a part connected with said piston of smaller area, and the said hollow piston rod, so that the first movement of the physically operable part will carry with it the said piston of smaller area, the piston connected with said hollow piston rod, and the movable part of the actuator connected therewith, until the resistance to the movement of the piston connected with the actuator equals or exceeds the initial resistance of said spring, after which the spring yields and permits the relative movement of the parts to operate said valve mechanism.

My invention also comprises means for compounding the hydraulic pressure where a higher hydraulic pressure is desired, which is capable of being operated by the power actuator, or directly by the physical force of the operator.

I attain these objects preferably by the means illustrated in the accompanying drawings, wherein similar parts are referred to throughout the several views by like numerals, in which:—

Figure 4 is a partial longitudinal section of a modification of the hydraulic cylinder and a portion of the hydraulic system.

Figure 5 is an enlarged longitudinal section of the valve mechanism.

Figure 6 is a plan of a compound hydraulic operating cylinder directly connected to the foot brake.

Figure 7 is a section taken on line 7—7 of Figure 6.

Figure 1:
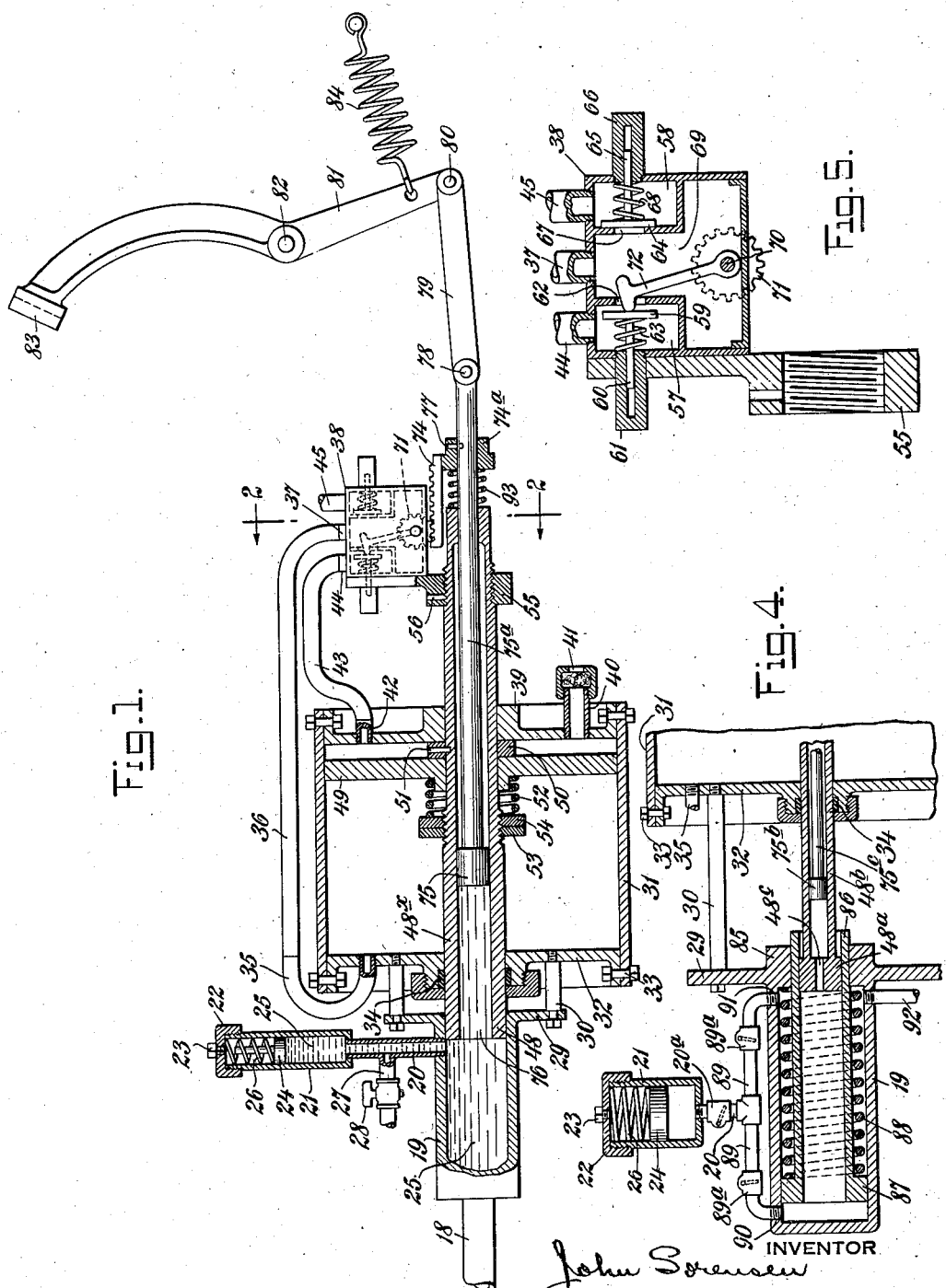
Figure 1 is a horizontal section of the device.
Figure 2:
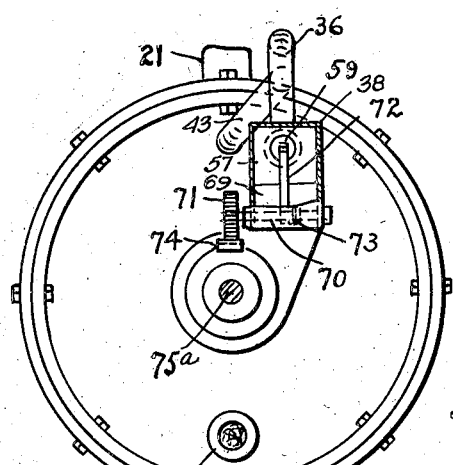
Figure 2 is an enlarged section taken on line 2—2 of Figure 1.

The vehicle 1, with its chassis 2 has four wheels 3, 4, 5 and 6 which have brake mechanism herein shown as band brakes 7, 8, 9 and 10, respectively, each of which is connected to a suitable hydraulic brake actuating mechanism comprising a cylinder and piston 11, 12, 13 and 14, respectively, said cylinders being connected together and to the main hydraulic operating cylinder 19 by pipes 15, 16, 17 and 18.

This main cylinder 19 is connected by the pipe 20 to a reservoir 21 provided with a cap 22 carrying an air plug 23 within which reservoir the piston 24 is held against the liquid 25 by the spring 26 and this pipe 20 has a pipe 27 connected thereto in any suitable way, containing a cock 28, said pipe 27 being provided for filling the system with liquid and the piston 24 with the spring 26 being provided for maintaining any suitable pressure upon the liquid 25 of the system.

The main cylinder 19 has a flange 29 connected by the bolts 30 to the actuator cylinder 31 having the end 32 bolted to the cylinder by the bolts 33.

This end 32 is provided with a gland 34 and a pipe 35 connected to a flexible pipe 36 which connects with the valve element 38 by the pipe 37.

The other end 39 of the actuator has an air opening 40 provided with an air strainer 41 and a pipe 42 connected to the flexible pipe 43 which communicates with the valve element 38 by the pipe 44 and this element 38 is also provided with a pipe 45 that is connected to the manifold 46 of the engine 47.

The hollow piston 48 which may be referred to as a piston with a hollow piston rod communicating with the cylinder, 19, slides within the cylinder 19. On the exterior portion of piston rod, 48x, of the hollow piston, 48, within the cylinder 31, is slidably mounted the actuator piston head 49 held against the ring 50, pinned to the hollow piston rod 48x by the pin 51, by the spring 52, the tension of which is regulated by means of the nuts 53 and 54.

This hollow piston rod 48x projects beyond the cylinder 31 and carries on its outer and outside end a frame 55 which is screwed into position thereon and held thereto by the pin 56.

This frame carries the valve box 38, see Figure 5, which is provided with two compartments 57 and 58. The compartment 57 is provided with a valve 59 having a valve stem 60 slidable within the boss 61 and the valve is normally held against its seat 62 by means of the spring 63. In the upper part of the compartment the pipe 44 is connected as heretofore described.

The compartment 58 is directly opposite and spaced from the compartment 57 and in this compartment in alignment with the valve 59 is the valve 64 with the stem 65 slidable within the boss 66 and this valve is held against its seat 67 by means of the spring 68 and the pipe 45 connects this compartment with the engine manifold.

Between these compartments 57 and 58 is the space 69 and directly below the center of this space is a shaft 70 carrying a pinion 71 and a T shaped arm 72 pinned to the shaft by the pin 73.

The pinion 71 meshes with the rack 74 carried by a collar, 74a fixed to the piston rod 75a of a piston, 75, slidable within the bore 76 of the hollow piston rod 48x, said rack being held in position by the pin 77 passing through the collar, 74a, and piston rod, 75a, and the end of the piston rod 75a has a link 79 pivoted thereto at 78, the other end of which is pivoted at 80 to the foot lever 81.

The air inlet, 40, provided with the air strainer, 41, serves to connect the portion of the actuator cylinder in rear of the piston (at the right in Fig. 1) at all times with the atmosphere, and also to supply the air admitted to the portion of the cylinder forward of the piston when the air inlet valve, 59, is open, which is its normal position in the released position of the parts, as shown in Fig. 1. When the valve, 59, is open the forward end of the cylinder is placed in connection with the atmosphere through pipes 42, 43, 44, the space, 69, in the valve casing, 38, the pipe 37, which communicates with said space, 69, and pipes, 36 and 35. The strainer, 41, thus prevents access of dust and dirt to either end of the actuator cylinder.

The foot lever is pivoted at 82 and is provided with a foot piece or pedal 83 and a return spring 84 for holding the lever and connected parts in the inoperative position.

Between the rack 74 and the end of the hollow piston rod 48x is a spring 93 which will carry the hollow piston 48 along with the piston rod, 75a, and piston 75 until the pressure on the liquid in the cylinder 19 is high enough to overcome the initial resistance of the spring whereupon a continued pressure of the foot lever 81 will move the piston rod, 75a, and piston, 75, with respect to the hollow piston, 48, and rod 48x, causing the rack, 74, to rotate the gear, 71, and shifting the arm, 72, so as to permit the valve, 59, to close under the action of its spring and to open the valve, 64.

In operation, when force is applied by the operator against the pedal 83 of the lever 81, the piston 75 and the piston rod 75a carrying the rack 74 are moved inwardly together with the piston rod 48x, carrying the pneumatic piston head 49 resiliently thereupon and the valve element 38 fixed to the piston rod 48x. These parts will move together until the pressure in the main pressure cylinder 19 of the hydraulic system offers sufficient resistance to overcome spring 93 and hold the piston 48 from moving forward with the piston 75, whereupon the piston 75 and piston rod 75a will move with respect to the hollow piston 48 and the rack 74 will operate the valve mechanism and connect the vacuum in the manifold with the actuator cylinder 31. This will cause the pneumatic piston head 49 to move and apply a gradual pressure through the spring 52 to the hollow piston 48 and cause it to move forward, increasing the pressure of the liquid in the cylinder 19. As will be readily seen such increased pressure reacts upon piston 75 and lever 81, and transmits to the foot of the operator a reactive force proportionate to the area of small piston 75.

If the operator stops the forward movement of the pedal the small piston 75, and its piston rod 75a, will stop and the continued movement of the actuator piston 49 and the main pressure piston 48, will effect a relative movement of the hollow piston rod, 48x, with respect to the piston rod, 75a, and cause the rack, 74, to operate the pinion, 71, so as to close the suction valve and hold the brakes as applied. The hydraulic pressure in the main pressure cylinder will react upon the small piston, 75, and create a reactive force against the foot of the operator, which increases as the pressure on the liquid in the main cylinder increases, and must be overcome by the operator to prevent the release of the brakes, or to apply increased pressure thereto. This reaction apprises the operator of the amount of power applied to the brakes, and the physical force exerted by the operator to overcome this reactionary force is necessarily transmitted to the brakes through small piston, 75, and the hydraulic medium. If the pedal is further depressed the brakes will be applied with greater pressure, and when the full power of the actuator has been exerted, the operator can apply further physical force by further depressing the pedal, and further actuating the small piston, 75, and the operator can apply brakes by physical force alone in case of failure of power.

It is obvious that various pressures may be placed upon the brakes so that the hydraulic braking power can be applied and released gradually and that manual power can be applied in addition.

Referring to Figures 6 and 7 the compound device is comprised of a cylinder 94 provided with two bosses 95 and 96 slidably holding the rod 97 and two bosses 98 and 99 slidably holding the rod 100.

The rods 97 and 100 are connected together on one end by the yoke 101 and nuts 102 and 103 which yoke carries a boss 104 holding a rod 105 pivoted to the link 107 by the pivot 106 which link on the other end is pivoted to a foot lever 108 by the pivot 109.

This foot lever 108 is pivoted at 111 and has a foot piece or pedal 112 on the other end.

The opposite ends of the rods 97 and 100 are held together by the yoke 113 and nuts 114 and 115 and to hold this yoke and its connecting parts in the operating position, a spring 116 is provided that may be fixed to the yoke piece 113 and to any suitable fixed point.

Riveted to this yoke at 117 is a rod 118 which passes through the guiding bearing 119 screwed upon a tube 120 within which the rod 118 carries a piston 121 provided with a gasket or packing ring 122 held thereon by the screw 124.

This tube 120 slides within the stuffing box 125 fixed to the cylinder 94 and the extreme end of the tube is provided with a piston or boss 126 which carries by the screws or rivets 127 the two gaskets or packing rings 128 and 129 and between this boss 126 and the box 125 is a return spring 130. The effective area of the piston, 126, is much greater than that of the piston, 121, as shown.

The space 131 at the end of the tube 120 is connected by a branch pipe 132 to a T 133 which is connected by another branch pipe, 132 to the space 134 between the cylinder 94 and tube 120 and the other outlet of this T is connected to a check valve 135. Each of the branch pipes, 132, is provided with a check valve, 132a, as shown. These check valves are free to open in a direction toward the cylinder, 94, to admit additional liquid from the reservoir, 136, when the parts are in released position, but will be closed whenever the pressure rises, in the cylinder above that in the reservoir, and thus prevent the by-passing of liquid around the piston, 126, from one end of the cylinder, 94, to the other.

The check valve 135 is connected to a reservoir 136 carrying a piston 137 with a piston stem 138 in the cap 139 which cap holds the air plug 140 and to hold this piston against the liquid 141 of the system the spring 142 is provided.

Figure 3:
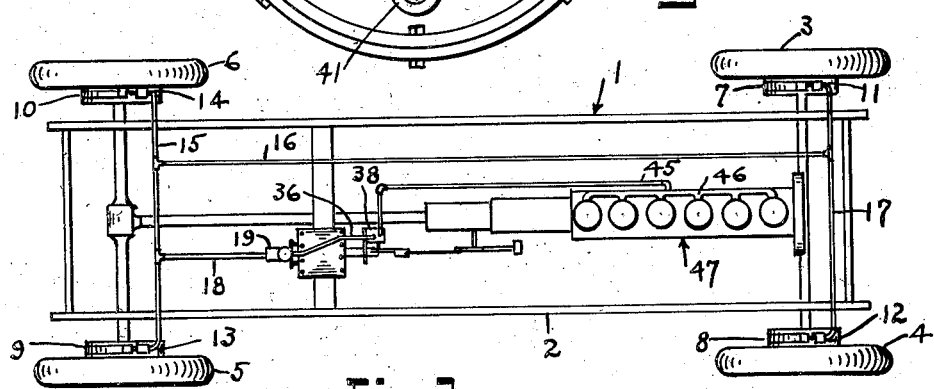
Figure 3 is a diagrammatic plan of the device as applied to an automobile.

The space 134 is also connected to the pipe 143 which is connected to the hydraulic pistons 11, 12, 13 and 14 as clearly shown in Figure 3.

In the operation, when the foot lever is moved, a certain amount of force will be exerted by the piston, 121, upon the liquid in the tube, 120, and transmitted to the liquid in the portion, 131, of the larger cylinder, 94, where it will exert the same force per square inch on the greater area of the piston, 126, so that the pressure applied by the foot will be multiplied in proportion to the respective areas of the pistons, 121 and 126, and this increased pressure will be transmitted to the liquid between the tube, 120, and cylinder, 94, and to the brake cylinders connected therewith.

It will be seen that as the foot moves forward with the pedal, 112 (to the right in Figure 7) the piston, 121, will move to the right also, while the piston, 126, and the tube or cylinder, 120, will move to the left. Portions of the liquid within the tube, 120, will be forced into the end, 131, of the cylinder, 94, as the movements of the parts progress, and the liquid in the space, 134, will be expelled through the pipe, 143, to the individual brake cylinders. When the foot releases the pedal, the retracting spring, 130, will move the larger piston, 126, to the right, Figure 7, withdrawing the liquid expelled to the brake cylinders, and releasing the brakes, and forcing the liquid in the portion, 131, of the cylinder, 94, back into the tube, 120, thereby returning the piston, 121, to its normal position.

In Fig. 4 I have shown the compound device of Figures 6 and 7 arranged to be substituted for the cylinder, 19, so that the brakes may be applied either by the foot pedal or by a power actuator, or both, as in the construction shown in Figs. 1, 2, 3 and 5. In this figure the cylinder, 19, corresponds with the cylinder, 94, of Figs. 6 and 7, but occupies a reversed position, and the cylinder, 19, is supported upon the flange, 29, in the same manner as the cylinder, 19, in Figure 1. At the inner end of this cylinder there is a ring, 85, through which slides a tube or inner cylinder, 86, which corresponds with the tube or cylinder, 120, of Figure 7, and this inner tube or cylinder, 86, carries at its inner end a piston, 87, corresponding with the piston, 126, in Fig. 7, which slides within the outer cylinder, 19. 88 is the retracting spring located between the inner cylinder, 86, and the outer cylinder, 19, and bearing against the piston, 87, and corresponding with the spring, 130, in Figure 7. Above the cylinder, 19, is a reservoir, 21, with its piston, 24, spring, 26, and plug, 23, said reservoir being connected by branch pipes, 89, respectively, with the cylinder, 19, at 90, and with the space between the cylinder, 19, and the tube, 86, at 91. Each branch pipe is necessarily provided with a check valve, 89a, as shown for the reason stated with reference to check valves 132a, 132a. Directly opposite the inlet, 91, is a pipe, 92, which is connected to the hydraulic pipe 18 of the system, in a manner similar to that shown in Fig. 3.

Within the outer end of the inner tube or cylinder, 86, is the piston, 48a, corresponding with the piston, 121, of Figure 7. This piston is carried by the hollow piston rod, 48b, communicating by a passage, 48c, with the interior of the inner tube or cylinder, 86, and in the hollow piston rod, 48b, is the piston, 75b, connected by the piston rod, 75c, with the pedal, in the manner illustrated. The hollow piston rod, 48b, is connected with the piston of the power actuator, indicated at 49 in Figure 1, in the same manner that it is there shown, connected with the hollow piston, 48, and the operation of the apparatus shown in Figure 1 will be the same, when the pressure apparatus illustrated in Figure 4 is substituted for the cylinder, 19, of Figure 1, except that the pressure applied to the liquid within the inner tube or cylinder, 86, by the piston, 75b, and by the piston, 48a, will be multiplied and transmitted to the liquid between the cylinder, 86, and the cylinder, 19, and thence by pipe, 92, to the brake cylinders, at a much greater pressure determined by the difference in the effective areas of the pistons, 75b and 48a, in proportion to the difference between the effective areas of the pistons, 75b and 48a, respectively, and the piston, 87. This increase in the pressure applied either by the foot or by the power actuator, to the pressure fluid in the brake cylinder is accomplished in exactly the same manner as that previously described and with reference to Figures 6 and 7.

It will be seen that in all forms of the invention, the back pressure on the small piston, 75 (Figure 1), 75b (Figure 4) and 121 (Figure 7), will be transmitted to the pedal and will react upon the foot of the operator, so as to apprise him of the extent to which the much greater power is being applied through the hydraulic pressure means and thence to the hydraulic brake cylinders. It will also be seen that the power of the actuator under the control of the brake pedal may be applied to the brake cylinders, either directly as shown in Figure 1, or through the pressure compounding apparatus, as shown in Figure 4, and it will also be seen that the pressure compounding apparatus may be operated directly by the pedal, if desired, as illustrated in Figures 6 and 7.

Having thus described and illustrated the preferred embodiment of my invention, I do not wish to limit myself to the exact construction or arrangement of parts shown, since it is evident that modifications may be made therein without departing from the spirit of the invention or scope of the claims.

I claim:—

1. In a hydraulic brake system for automotive vehicles, the combination with hydraulic pressure means including a cylinder and a pressure piston therein provided with a hollow piston rod communicating with said cylinder, a smaller piston within said hollow piston rod, a physically operable part operatively connected with the said smaller piston, a fluid pressure operated power actuator comprising relatively movable parts, one of said parts being operatively connected with said hollow piston rod, controlling valve mechanism for the actuator, and valve actuating means brought into operation by the relative movement of said smaller piston with said hollow piston rod, the pressure within said pressure cylinder being transmitted at all times through said smaller piston to the physically operable part.

2. In a hydraulic brake system for automotive vehicles, the combination with hydraulic pressure means including a cylinder, a hollow pressure piston therein, and a hollow piston rod therefor communicating with the said cylinder through the hollow piston, a smaller piston in said hollow piston rod, a physically operable part operatively connected with said smaller piston, a fluid pressure operated power actuator comprising a cylinder, a piston therein, operatively connected with said hollow piston rod, and controlling valve mechanism, actuating means for said valve mechanism brought into operation by the relative movement of said smaller piston with said hollow piston rod, the pressure within said pressure cylinder being transmitted at all times through said smaller piston to the physically operable part.

3. In a hydraulic brake system for automotive vehicles, the combination with hydraulic pressure means including a cylinder, a hollow pressure piston therein, and a hollow piston rod therefor communicating with the said cylinder through the hollow piston, a smaller piston in said hollow piston rod, a physically operable part operatively connected with said smaller piston, a fluid pressure operated power actuator comprising a cylinder, a piston therein, operatively connected with said hollow piston rod, and controlling valve mechanism carried by said hollow piston, and including a toothed member, and a valve operating part connected therewith, a rack operatively connected with said smaller piston and engaging said toothed member for operating the valve mechanism by relative movement of the smaller piston with respect to said hollow piston rod, the pressure within said pressure cylinder being transmitted at all times through said smaller piston to the physically operable part.

4. In a hydraulic brake system for automotive vehicles, the combination with hydraulic pressure means including a cylinder, a hollow pressure piston therein, and a hollow piston rod therefor communicating with the said cylinder through the hollow piston, a smaller piston in said hollow piston rod, a physically operable part operatively connected with said smaller piston, a fluid pressure operated power actuator comprising a cylinder, a piston therein, operatively connected with said hollow piston rod, and controlling valve mechanism carried by said hollow piston rod, and comprising oppositely disposed valves, an oscillating valve actuating part, and a toothed member operatively connected therewith, and a rack operatively connected with said smaller piston and engaging said toothed member for operating the valve mechanism by relative movement of the smaller piston with respect to said hollow piston rod, the pressure within said pressure cylinder being transmitted at all times through said smaller piston to the physically operable part.

5. In a hydraulic brake system for automotive vehicles, the combination with hydraulic pressure means including a cylinder, a hollow pressure piston therein, and a hollow piston rod therefor communicating with the said cylinder through the hollow piston, a smaller piston in said hollow piston rod, a physically operable part operatively connected with said smaller piston, a fluid pressure operated power actuator comprising a cylinder, a piston therein, operatively connected with said hollow piston rod, and controlling valve mechanism, actuating means for said valve mechanism brought into operation by the relative movement of said smaller piston with said hollow piston rod, and yielding means interposed between a part connected with said smaller piston and the said hollow piston rod for transmitting to said hollow piston rod physical pressure applied to said smaller piston through said physically operable part, the pressure within said pressure cylinder being transmitted at all times through said smaller piston to the physically operable part.

6. In a hydraulic brake system for automotive vehicles, the combination with hydraulic pressure means including a cylinder, a hollow pressure piston therein, and a hollow piston rod therefor communicating with the said cylinder through the hollow piston, a smaller piston in said hollow piston rod, a physically operable part operatively connected with said smaller piston, a fluid pressure operated power actuator comprising a cylinder, a piston therein, operatively connected with said hollow piston rod, and controlling valve mechanism carried by said hollow piston rod, and including a toothed member, and a valve operating part operatively connected therewith, a rack operatively connected with said smaller piston and engaging said toothed member, and a spring interposed between a part connected with said smaller piston and the hollow piston rod for transmitting to said hollow piston rod physical pressure applied to said smaller piston through said physically operable part, the pressure within said pressure cylinder being transmitted at all times through said smaller piston to the physically operable part.

7. In a hydraulic brake system for automotive vehicles, the combination with a main pressure cylinder, a second cylinder movable longitudinally within the same and provided with a piston, said cylinders communicating with each other adjacent to one face of the piston, and a pressure outlet communicating with the space between said cylinders on the opposite face of said piston, a second piston of smaller area than the main piston working in said second cylinder, a physically operable part, means for applying force to said second piston under the control of said physically operable part, said physically operable part being operatively connected with a part subjected to the fluid pressure in said second cylinder operating in a direction to resist the force applying movement of said physically operable part.

8. In a hydraulic brake system for automotive vehicles, the combination with a main pressure cylinder, a second cylinder movable longitudinally within the same and provided with a piston, said cylinders communicating with each other adjacent to one face of the piston, and a pressure outlet communicating with the space between said cylinders on the opposite face of said piston, a second piston of smaller area than the main piston working in said second cylinder, a hollow piston rod connected with said second piston, and communicating with said second cylinder, a third piston in said hollow piston rod, a fluid pressure operated power actuator having a movable part connected with said hollow piston rod, controlling valve mechanism for said actuator operated by the relative movement between said third piston and said hollow piston rod, a physically operable part, and operative connections therefrom to said third piston.

9. In a hydraulic brake system for automotive vehicles, the combination with a main pressure cylinder, a second cylinder movable longitudinally within the same and provided with a piston, said cylinders communicating with each other adjacent to one face of the piston, and a pressure outlet communicating with the space between said cylinders on the opposite face of said piston, a second piston of smaller area than the main piston working in said second cylinder, a hollow piston rod connected with said second piston, and communicating with said second cylinder, a third piston in said hollow piston rod, a fluid pressure operated power actuator having a movable part connected with said hollow piston rod, controlling valve mechanism for said actuator carried by said hollow piston rod, and including a movable valve operating part, a physically operable part connected with said third piston, and a part connected with said third piston for actuating said valve operating part by a relative movement between said third piston and the said hollow piston rod.

10. In a brake system for automotive vehicles, a brake, brake operating means including a fluid operated brake applying motor, force transmitting connections interconnecting said brake and the power element of said motor, valve means for controlling the operation of said motor, manually operable means for operating said valve and a connection between said manually operable means and said valve, said valve comprising two major working parts, one of said parts being secured to the aforementioned power element of the motor and the other of said parts being interconnected with the manually operable means through the intermediary of the aforementioned connection, and means interconnecting said force transmitting connections and said last mentioned connection, said latter means serving to both transmit the physical effort of the operator to apply the brake manually and to transmit to the manually operable member a reactive force as the brake is being applied by power to thus apprise the operator of the degree of power operation of the brake.

11. In an automotive brake operating mechanism, a pressure differential operated motor, a fluid connection between the power element of said motor and brakes to be operated, a control valve for said motor comprising two relatively movable parts, a manually operable brake operating member, means interconnecting said power element and one of said valve parts, and other means interconnecting the other of said aforementioned valve parts, the fluid connection and the manually operable member.

12. In a brake operating mechanism for automotive wheel brakes, a pressure differential operated motor, a fluid force transmitting connection interconnecting the power element of said motor and the brakes to be operated, said connection comprising a master cylinder, a control valve for said motor comprising relatively movable parts so constructed as to provide a follow-up control of the servo motor, a brake controlling operator operated part, means interconnecting one part of said valve and said power element, and other means positively interconnecting another part of said valve, said operator operated part and said fluid connection, whereby the operator is aided in the control of the brakes both by the follow-up control of the servo motor and by the reactionary force upon the operator operated member from the fluid connection as the brakes are applied by power.

13. In a braking system employing liquid for transmitting the brake applying force, with a master cylinder having a piston movable therein for the purpose, a vacuum cylinder, a power piston movable in said vacuum cylinder, piston rod means connecting said pistons, valve means arranged for connecting a source of negative fluid pressure with the vacuum cylinder, operator operated means for controlling said valve means, said master cylinder piston having an opening, and means associated with said opening for causing said valve means actuation to be opposed in amounts varying with the pressure of the liquid against said master cylinder piston.

14. In brake operating mechanism for automotive wheel brakes, a hydraulic master cylinder including a master cylinder piston, a power device for actuating said master cylinder piston, a foot pedal controlling said power device, a piston associated with said foot pedal, and connections leading from said master cylinder to said piston whereby the pressure exerted by said power device on the liquid in said master cylinder reacts upon said pedal.

15. In a braking system employing a liquid filled expansible chamber for applying the braking force, fluid-pressure responsive means associated with said expansible chamber means for producing a braking force upon the confined liquid, operator operated valve means for controlling said fluid-pressure-responsive means, and means to cause the brake-applying actuation of said valve means to be opposed in amounts varying with the pressure of said liquid.

16. In a braking system employing liquid for transmitting the brake applying force, with a master cylinder having a piston movable therein for the purpose, a vacuum cylinder, a power piston movable in said vacuum cylinder, means connecting said pistons whereby said master cylinder piston may be moved by said power piston to apply the brake, valve means arranged for connecting a source of negative fluid pressure with the vacuum cylinder, operator operated means for controlling said valve means, and means causing opening operation of said valve means to be opposed in amounts varying with the pressure of said liquid.

JOHN SORENSEN.